US006824464B2

(12) United States Patent
Weil et al.

(10) Patent No.: US 6,824,464 B2
(45) Date of Patent: Nov. 30, 2004

(54) PREPAID ACCOUNT LOTTERY SYSTEM AND METHOD

(75) Inventors: Allan Lorne Weil, New York, NY (US); William James Huntley, Cumming, GA (US)

(73) Assignee: Scientific Games Corporation, New York, NY (US)

( * ) Notice: Subject to any disclaimer, the term of this patent is extended or adjusted under 35 U.S.C. 154(b) by 0 days.

(21) Appl. No.: 10/266,292

(22) Filed: Oct. 8, 2002

(65) Prior Publication Data

US 2003/0092479 A1 May 15, 2003

Related U.S. Application Data

(63) Continuation-in-part of application No. 10/037,323, filed on Nov. 9, 2001, now abandoned.

(51) Int. Cl.[7] .......................... G06F 19/00; G06F 17/00
(52) U.S. Cl. .......................................... 463/17; 273/269
(58) Field of Search .............................. 463/17, 40–42; 273/269

(56) References Cited

U.S. PATENT DOCUMENTS 4,764,666 A * 8/1988 Bergeron ..................... 463/25
5,265,874 A * 11/1993 Dickinson et al. ............ 463/25
5,415,416 A * 5/1995 Scagnelli et al. ............. 463/25
5,491,326 A * 2/1996 Marceau et al. ............ 235/381
5,800,269 A * 9/1998 Holch et al. .................. 463/42
6,107,932 A * 8/2000 Walker et al. ............. 340/5.22
6,244,958 B1 * 6/2001 Acres .......................... 463/26
6,302,793 B1 * 10/2001 Fertitta et al. ................ 463/25
6,497,408 B1 * 12/2002 Walker et al. ........... 273/138.1

FOREIGN PATENT DOCUMENTS

JP 04-370879 A * 12/1992 ........... G06F/15/28

* cited by examiner

*Primary Examiner*—Julie Brocketti
(74) *Attorney, Agent, or Firm*—Duane Morris LLP

(57) ABSTRACT

A plurality of lottery cards are distributed to at least one lottery agent. Each of the lottery cards has a unique identification code disposed thereon and is associated with a predefined monetary amount. A communication identifying the unique identification code of a first selected card is received, and a user account associated with the identification code is established having a balance equivalent to the predefined monetary amount of the first selected card. A first chosen play for a lottery game is received and associated with the user account. A cost of the first chosen play is deducted from the balance of the user account, and a remaining balance is available for making at least one subsequent play. If the first chosen play is a winner, a winning monetary amount is credited to the user account. The winning monetary amount may be redeemed upon presentation of the first selected card.

31 Claims, 3 Drawing Sheets

PREPAID ACCOUNT LOTTERY SYSTEM AND METHOD

CROSS-REFERENCE TO RELATED APPLICATION

This application is a continuation-in-part of U.S. patent application Ser. No. 10/037,323 filed Nov. 9, 2001, now abandoned, entitled "Prepaid Account Card Lottery System and Method," to Allan L. Weil, the entirety of which is hereby incorporated by reference herein.

FIELD OF THE INVENTION

This invention relates to lottery systems, and more specifically to account based lottery systems.

BACKGROUND OF THE INVENTION

U.S. Pat. No. 5,327,485 to Leaden, entitled "Telephone Lottery Play System," issued Jul. 5, 1994 (hereinafter the '485 patent), describes a lottery system where a customer buys a lottery booklet with a plurality of numbered playslips for recording lottery plays. The customer calls a telephone lottery computer that interfaces the customer with a state lottery gaming computer. Through the telephone lottery computer, the customer places a lottery play after providing a play slip number. The customer can record the play on the playslip in writing, and a transaction number is provided by the system, also for recording on the playslip. Each playslip thereafter serves as a single lottery ticket for validation and redemption purposes.

A second lottery system is described in U.S. Pat. No. 6,203,011 to Nulph, entitled "System for Administering an Interactive Transaction in a Lottery Game," issued Mar. 20, 2001 (hereinafter the '011 patent). In the system of the '011 patent, a lottery ticket is printed having a plurality of play spots thereon. Each play spot has a predetermined value from a set of values, and the values are distributed randomly on the tickets. Each of the playspots is covered with a removable medium, and a unique identifier is placed on each ticket. A record of the unique identifier and the value of the play spot for the ticket are stored in a database. After a customer identifies a ticket by the unique identifier to a controlling authority, the customer selects the lottery numbers to be played. The controlling authority then instructs the customer as to which play spots to uncover. The ticket then serves as the customer's lottery ticket for validation and redemption.

While both the '485 and '011 patents allow a customer to prepay for the ability to place lottery plays at a time after purchase of a lottery ticket or book of tickets, there remains a need to incorporate such flexibility within an account based lottery system where lottery agents are not excised from the process, such that the lottery agents are motivated to actively support sales efforts.

SUMMARY OF THE INVENTION

A lottery is administered by receiving from a user a communication identifying a unique identification code of a first selected card from a plurality of lottery cards distributed to at least one lottery agent for sale to at least one user. Each of the lottery cards from the plurality of lottery cards has a unique identification code disposed thereon and each of the lottery cards is associated with a predefined monetary amount. A user account associated with the unique identification code for the first selected card is established. The user account has a balance equivalent to the predefined monetary amount associated with the first selected card. A communication identifying a first chosen play for a lottery game is received from a user, and the first chosen play is associated with the user account. A cost of the first chosen play is deducted from the balance of the user account. A remaining balance in the user account is available for making at least one subsequent play. If it is verified that the first chosen play is a winner, a winning monetary amount for the first chosen play is credited to the user account. The winning monetary amount may be redeemed upon presentation of the first selected card to an authorized lottery agent.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention as well as other information pertinent to the disclosure, in which.

DETAILED DESCRIPTION OF THE INVENTION

As used herein, "lottery" means an event involving chance and awarding a prize, whether it be monetary or otherwise, where the ability to play is based on receipt of consideration.

Figure 1:
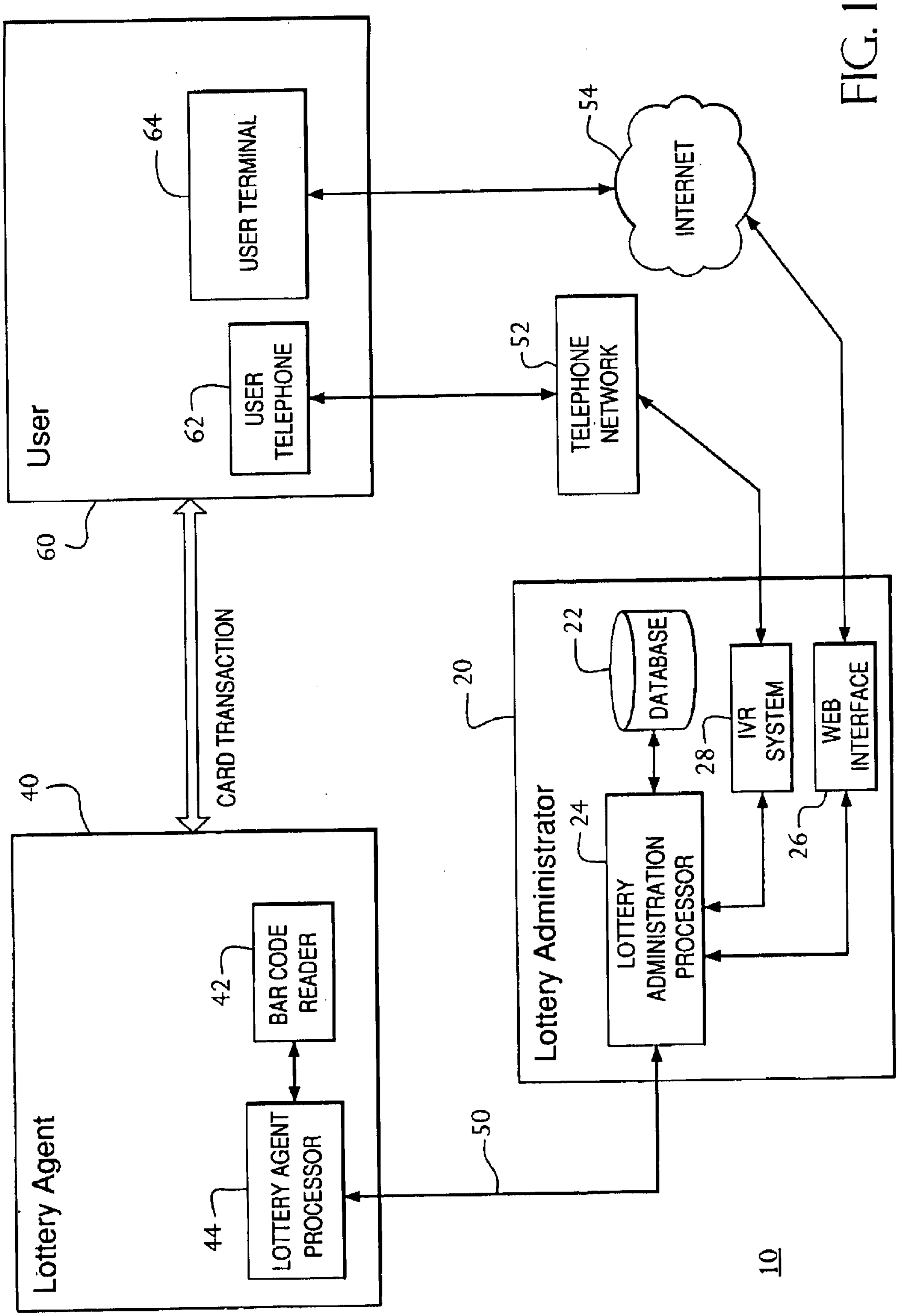
FIG. 1 is a stylized overview of a lottery system.

Referring to FIG. 1, a stylized overview of a lottery system 10 is provided. An exemplary lottery administration system is described in connection with the system diagram of FIG. 1 and the flow diagram of FIG. 2. As described hereafter, the lottery system 10 includes three primary components: Lottery Administrator 20, Lottery Agent 40 and User 60.

Figure 2:
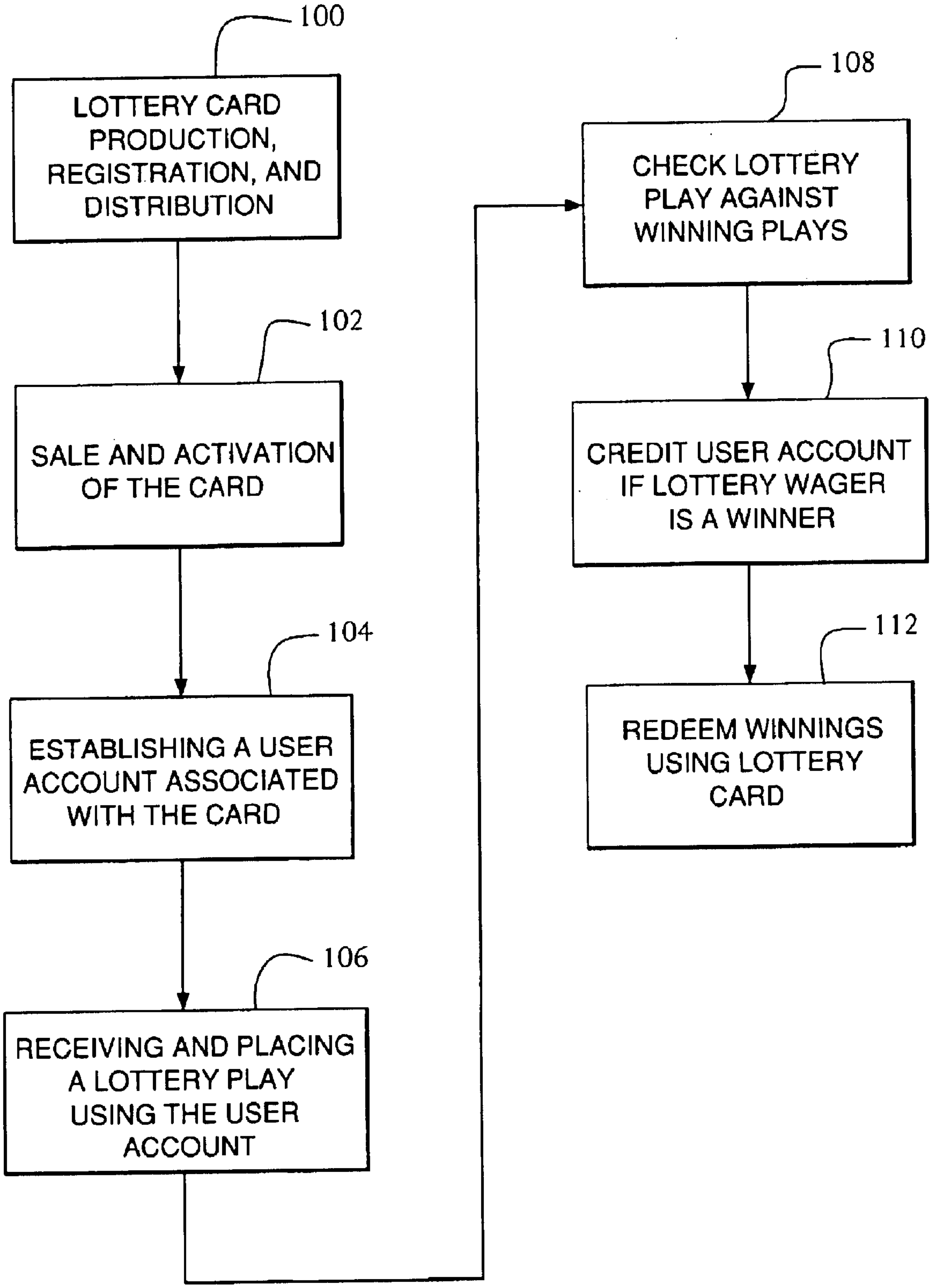
FIG. 2 is a flow diagram illustrating an exemplary method of administering a lottery.

Referring to the flow diagram of FIG. 2, at step 100, a plurality of lottery cards are produced, registered into the lottery system 10 and distributed to at least one Lottery Agent 40 for sale to at least one User 60. Each lottery card is a prepaid account card having a predefined monetary face value, e.g., $10, $25, $100, etc. Each card also has a unique identification code associated with the card and preferably printed or otherwise indicated on the face of the card. The unique identification code associated with each respective card is preferably printed in a conspicuous location on the face of the card and covered with a removable medium, such as a latex covering or a pull-off or peal-off tab. A bar code, magnetic stripe, or other like identifier representing the unique identification code for the individual ticket is also preferably printed or otherwise disposed on the face of the lottery card. The unique identification code may be an alphabetic code, a numeric code, an alphanumeric code, or other appropriate identification code capable of uniquely identifying an individual card.

Lottery Administrator 20 is typically, but not necessarily, an administrator of a state lottery game. This administrator may be the state entity itself or an entity contracted to administer the lottery on behalf of the state. Of course, Lottery Administrator 20 may also administer a multi-state lottery, i.e., a lottery that accepts wagers from more than one state. Before the lottery cards are distributed to Lottery Agents 40 by Lottery Administrator 20 for sale to Users 60, a record of each lottery card is recorded in the lottery system 10. For example, the unique identification code, face value, and status of each card may be stored in a data storage unit 22. A status flag associated with each card indicates a status for each card, such as "not distributed," "distributed," "sold," or "account opened." A status of "not distributed" indicates that a card has been manufactured but has not been distributed to a Lottery Agent 40. Appropriately, a status of "distributed" identifies that the card has been distributed to a Lottery Agent 40. Further, a status of "sold" indicates that a distributed card has been sold or otherwise properly distributed by a Lottery Agent 40 to a User 60 but that no user account has been established and associated with the card. Last, "account opened" indicates that the card has been properly distributed to a User 60 and a user account has been established and associated with that card. Of course, other statuses may also be utilized as appropriate. An example may include "invalid" for cards that have been stolen or otherwise inappropriately obtained or that have been lost.

Once a lottery card is provided to a Lottery Agent 40 for sale to a User 60, the status of the card in database 22 is updated to "distributed" as set forth above. The prepaid lottery card is then available for sale and activation as indicated by step 102. When a User 60 purchases a lottery card from a Lottery Agent 40, e.g., the User 40 pays $25 for a lottery card having a face value of $25, the Lottery Agent scans the bar code printed on the lottery card with bar code reader 42. One of ordinary skill should recognize that other types of readers may also be utilized, such as magnetic stripe readers. The unique identification code retrieved from the bar code is transmitted using lottery agent processor 44 to lottery administration processor 24 over communication link 50. Lottery agent processor 44 and lottery administration processor 24 are processors specifically programmed to function within system 10. Lottery agent processor 44 is configured to transmit the unique identification code of a scanned lottery card through a dial up connection, dedicated data line or other communication link 50 to lottery administration processor 24, along with a unique identifier identifying the Lottery Agent 40. The identifier identifying the Lottery Agent 40 may be preprogrammed into the lottery agent processor 44 or manually entered by the Lottery Agent 40. Lottery administration processor 24 is configured to verify that the status of the lottery card associated with the unique identification code received from the lottery agent processor 44 is "distributed" and to appropriately change the status indicator in database 22 to "sold." Lottery administration processor 24 is also configured to perform other function as further described below in connection with system 10.

It should be understood that other manners of providing the unique identification code of a lottery card from Lottery Agent 40 to Lottery Administrator 20 may be utilized, although they may not be preferred. Examples include manual entry of the unique identification code into lottery agent processor 44 using a keyboard interface and direct contact with a live telephone operator of the Lottery Administrator 20 using, for example, a telephone. These alternatives may be utilized, for example, when a bar code reader 42 malfunctions or the bar code can not be read from a lottery card for any reason. These alternatives require the Lottery Agent 40 to remove any latex or other mask covering the unique identification code.

The activation step 102 accomplishes several things. Only authorized agents have access to the bar code reader 42 and lottery agent processor 44. The activation step allows the Lottery Administrator 20 to identify any cards that have not been properly purchased from or distributed by a Lottery Agent 40. This step is important because, unlike instant lottery cards, prepaid account cards are generally the equivalent of legal tender. Second, a Lottery Agent's account maintained by the Lottery Administrator 20 can be credited for commission purposes. This is important because Lottery Agents are thereby provided an incentive and motivation to promote the sale of the lottery cards. Last, the step permits the Lottery Administrator to award bonuses to a Lottery Agent 40 that sells a lottery card used to win a winning jackpot.

After a User 60 has properly obtained a lottery card and it has been activated as described in connection with step 102, a user account is established and associated with the card at 104. Communications between the User 60 and the lottery administration processor 24 of the Lottery Administrator 20 may be facilitated through a user telephone 62, telephone network 52, and Interactive Voice Response (IVR) system 28 or through user terminal 64, Internet 54 and Web interface 26, as described below.

User telephone 62 is a conventional telephone, such as a telephone connected to a landline or wireless telephone that communicates through a telephone network 52, which may be, for example, a publicly switched telephone network (PSTN) or wireless network. IVR system 28 is programmed to interact with the User 60 through a series of voice prompts responsive to selections and information provided by the User 60 through touch tone signals from user telephone 62 or voice signals (if the IVR system includes voice recognition capabilities). For example, the IVR system 28 can prompt the User 60 to "press '1' if you wish to establish an account with a prepaid account card."

User terminal 64 is any device capable of interactive communications through Internet 54 with a processor 26, which generates an interface for communicating with a User 60. One of ordinary skill will recognize that access to Web interface 26 through Internet 54 is generally accomplished using a user terminal 64 that is a personal computer programmed with a Web browser; the most popular of which presently are Netscape Navigator and Microsoft Internet Explorer. User terminal 64, programmed with a Web browser, accesses a particular Web page, the content of which is located on the local data storage unit associated with Web interface 26. The user terminal may be a computer terminal, a pager that can communicate through the Internet using the Internet Protocol (IP), a Kiosk with Internet access, a connected electronic planner (e.g., a PALM device manufactured by Palm, Inc.) or other device capable of interactive network communication, such as an electronic personal planner. The user terminal 64 may also be a wireless device, such as a hand held unit (e.g., cellular telephone) that connects to and communicates through the Internet using the wireless access protocol (WAP).

Regardless of whether the User 60 utilizes a user telephone 62 or user terminal 64 at step 104 to communicate with lottery administration processor 24, the User 60 provides the unique identification code associated with a purchased lottery card (hereinafter referred to as the "first selected card"). For example, after the User 60 calls the IVR system 28 (using a telephone number printed on the lottery card) and the User 60 indicates as described above that he or she wishes to establish a user account, the IVR system 28 prompts the User 60 to enter the numbers of the unique identification code for the first selected card using the touch-tone key pad, with each number separated by the pound ("#") sign for example. Alternatively, the User 60 can access the Web interface 26 using a user terminal 64 by entry of a domain name (that is preferably also printed on the face of the lottery card) in a Web browser. After the Web interface 26 is contacted, a textual or graphical interface screen (e.g., Web page) generated by Web interface 26 prompts the User 60 to enter the unique identification code for the first selected card.

Although the lottery administration processor 24, IVR system 28 and Web interface 26 are shown as separate components in FIG. 1, this need not be the case. One of ordinary skill should recognize that some or all of the functionality provided by these components may be consolidated in total or in part within a single processor if desired. Likewise, lottery agent processor 44 and bar code reader 42 (or other scanning device) may be combined into a single special purpose unit. Still further, one of ordinary skill should recognize that the telephone communications can now be facilitated through Internet 54, and therefore, it is contemplated that a User 60 may communicate with an IVR system 28 through Internet 54.

The unique identification code for the first selected card that is received by the IVR system 28 or Web interface 26 is forwarded to the lottery administration processor 24 in order to establish an account associated with the first selected card's unique identification code. The lottery administration processor 24 establishes a user account for the User 60 having an account number that is preferably the unique identification code for the first selected card. The status flag for the first selected card in database 22 is changed to "account opened," and an account balance is assigned to the user account in the amount of the face value of the first selected card. The face value is retrieved from the database 22. This balance is then available for use by the User 60 in making lottery plays as described below in connection with step 106.

After the user account has been established at step 104, lottery wagers can be placed using the user account. A lottery wager is received from the User 60 and registered by the Lottery Administrator 20 at step 106. Prior to a lottery drawing, the User 60 contacts either IVR system 28, using user telephone 62, or contacts Web interface 26, using user terminal 64. The User 60 is asked whether he or she whishes to make a lottery play from a user account. If the User 60 selects this option, either the IVR system 28 or Web interface 26 prompts the User 60 to transmit the unique identification code for the first selected card to the Lottery Administrator 20. Once the unique identification code is received, the User 60 selects the type of lottery game to played (e.g., Pick 6, Daily Number, etc.) and the date of the lottery drawings to be played. The User 60 then makes a selection for a lottery play. For example, the User 60 can select six numbers for a six number lottery drawing. The User 60 may also opt to have the Lottery Administrator 20 pick six random numbers for the User 60 using an appropriate algorithm run by lottery administration processor 24. This option is typically referred to as a "quick pick." The lottery pick selected by the User 60, whether it be by "Quick Pick" or otherwise, is preferably repeated to the User 60, such as by a voice indication by IVR system 28 or textual message by Web interface 26 so that the User 60 can affirmatively confirm the play, e.g., "press '1' if your wish to make this play" or "click the 'ACCEPT' button if you with to make this play."

Regardless of the manner in which the User 60 selects his or her numbers, the lottery administration processor 24 records the lottery play in database 22 and associates the play with the unique identification code, and thus the user account, for the first selected card. Of course, the system 10 should allow the User 60 to place more than one lottery play at a time as long as sufficient funds are present in the user account associated with the unique identifier of the first selected card. To that end, the IVR system 28 and Web interface 26 preferably provide the User 60 the option of checking the balance recorded in database 22 for the user account associated with the first selected card.

The cost of the lottery play (e.g., $2 times the number of lottery play selected by the user) is then deducted from the original account balance of the user account. The remaining balance (i.e., the original balance minus the cost of the lottery play(s)) is available for the User 60 to place subsequent lottery plays in the manner just described in connection with step 106. For example, User 60 may opt to place make a lottery place from the user account at a later date.

Referring to step 108, after a User 60 has placed a lottery play using the system 10, and after a lottery drawing has been made and certified, all lottery plays registered in step 108 for that particular lottery drawings are compared against the set of winning plays by lottery administration processor 24. If it is verified by the lottery administration processor 24 that a lottery play is a winner, e.g., the lottery play matches one of the winning plays in the set of winning plays, then the user account associated with the winning lottery play is credited a winning monetary amount—a predefined monetary value or the percentage of the lottery pot to which the winning lottery play is entitled.

As indicated by step 112, the winnings represented in the balance of the user account may then be redeemed by presenting the first selected card to an authorized Lottery Agent 40. The Lottery Agent 40 can scan the bar code of the lottery card using bar code reader 42 in order to transmit the unique identification code using lottery agent processor 44 to the lottery administration processor 24 along with a request for the balance of the user account associated with the transmitted unique identification code. It is preferable that the lottery administration processor 24 distinguish between funds that may be redeemed and those that may not. For example, it is preferred that only winnings be redeemable, leaving any unwagered funds from the original user account balance available to be wagered by User 60. Also, some lottery Agents 40 may only be able to pay out winning funds that do not exceed a predefined monetary threshold, such as $500. Any funds in excess of this amount must be paid by the Lottery Administrator 20 acting as the authorized lottery agent for payment upon presentation of the lottery card. If the system 10 allows all funds to be redeemed, i.e., both winnings and funds from the original account balance, the Lottery Agent 40 is preferably only credited for lottery plays actually placed using the user account, rather than for the entire value of a prepaid lottery account card purchased from the Lottery Agent 40.

The system 10 may also be configured to allow the User 60 to make lottery plays using funds won from a lottery drawing and credited to a user account associated with the first selected card. Conversely, the system 10 may be configured to preclude such wagers, requiring the User 60 to have sufficient funds in a user account to cover all lottery plays without using winnings. This latter option helps guarantee that a User 60 who has won a significant prize continues to purchase lottery cards (if indeed the User 60 continues to purchase lottery cards) from a Lottery Agent 40 rather than simply placing lottery plays perpetually from the winning balance. This option helps feed business to Lottery Agents 40 and ensures the continued support and promotion of the lottery system 10 by Lottery Agents 40.

In an exemplary system 10, a User 60 may purchase a second lottery card from a Lottery Agent 40. The second lottery card is produced, registered and distributed as described above in connection with step 100. The lottery card is also sold and activated in accordance with step 102. At this stage, however, the system 10 preferably provides the User 60 with two options. First, the User 60 can use the second lottery card to establish a second user account associated with the unique identification code for the second lottery card. This second user account is established as described in connection with step 104. Lottery plays may be placed and subsequently redeemed as described above in connection with steps 106 to 112, only from the second user account and using the second selected card. In a second option, however, the system 10, through IVR system 28 or Web interface 26, allows the User 60 to use the funds associated with the second lottery card to replenish the account balance of the first user account associated with the first selected card. The IVR system 28 or Web Interface 26 prompts the User 60 to select between the option of opening a new account associated with the received unique identification code for the second lottery card and the option of adding the monetary face value (or part thereof) to an existing account. If the latter option is selected, the User 60 provides the unique identification number for the user account to which the funds should be added, i.e., the unique identification code of the first selected card for example. In either embodiment, a Lottery Agent 40 is still active in the process because the second lottery card is purchased from a Lottery Agent 40, and the Lottery Agent 40, therefore, is eligible for commissions and bonuses.

Lottery Administrator 20 also preferably allows the User 60 to check the results of previous lottery drawings through IVR system 28 and Web interface 26. If the User 60 selects this options. Lottery administration processor 24 accesses the results of a lottery drawings for a date specified by the User 60 and provides these results to the User 60 through IVR system 29 or Web interface 26. These results may be retrieved from a database 22. If desired, this service may be provided only to Users 60 that have user accounts registered with Lottery Administrator 20.

The above described system provides Users 60 the flexibility inherent with account based wagering in that it allows impulse wagering, while ensuring the continued support of the lottery system by Lottery Agents 40. Users 60 can place lottery wagers at any time from substantially any location, thereby avoiding significant inconveniences such as travel, lines, etc. Lottery Agents 40 are still credited for sales of prepaid cards and are eligible for bonuses, just as if the User 60 had purchased individual lottery tickets in person with the Lottery Agent 40. Redemption of the lottery card is made through a Lottery Agent 40, thereby driving secondary business to the agent as well as increasing the chance that a User 60 will purchase a second prepaid card from the agent.

It is contemplated that a single prepaid card can have several different unique identification codes associated with it, each of which, however, still identifies the prepaid card or an account associated with the card. For example, a first code may be used by Lottery Agent 40 in activating the card, a second code may be used by the User 60 in initially establishing the user account, and a third code may be utilized when actually placing lottery wagers. The first code may be retrieved from the bar code disposed on the card. The second code may be covered by a latex coating on the card and be different from the first unique identification code. When the User 60 uses the second code to establish the user account (after removing any cover), the system can prompt the User 60 to establish a third code associated with the second code, for example a four digit pin number. When the User 60 contacts Lottery Administrator 20 to place a lottery play, the User 60 transmits the second unique identification code along with the pin number that User 60 has established. In this manner, lost or stolen cards cannot be used, being that the User 60 preferably does not write the pin number on the prepaid card.

Another exemplary embodiment of a method of administering a lottery is explained in connection with the flow diagram of FIG. 3 and FIG. 1. In this embodiment, account cards are not preprinted, registered and distributed to a lottery retailer for sale as described above in connection with steps 100 and 102 of FIG. 2. Rather, lottery agent processor 44 is configured to initiate the transaction much like existing lottery terminals often found at convenience stores. At step 200, after a customer indicates to a Lottery Agent 40 that the customer wishes to purchase an account card, specifically a lottery account voucher, for a specified value, e.g., $25, the lottery retailer enters the specified value into lottery agent processor 44. The lottery processor 44 communicates with lottery administration processor 24 through communication link 50 as described above with a request for a unique identification code for a voucher and provides the monetary amount for the voucher to the lottery administration processor 24. The lottery administration processor 24 then assigns a unique identification code to a voucher that is to be created by Lottery Agent 40, e.g., printed by lottery agent processor 44, and distributed by the lottery agent to the user. As described above, this unique identification code may be an alphabetic code, a numeric code, an alphanumeric code, or other appropriate identification code capable of uniquely identifying an individual voucher. The lottery administration processor 24 either generates the unique identification code at this point or retrieves a code from a list of unassigned codes in database 22. Once an identification code is assigned to the voucher that is to be created and distributed, it is stored in database 22 and associated with the monetary amount received from the lottery agent processor 44.

The unique identification code for the voucher is then communicated to the lottery agent processor 44 through communication link 50 as authorization to create the voucher. The lottery agent processor 44 then creates the voucher at step 202, such as by printing the voucher, that is associated with the monetary amount and the unique identification code and the voucher is provided or distributed by the Lottery Agent 40 to the customer. A bar code, printed alphanumerical code, magnetic strip, or combination thereof, or other indicia representing the unique identification code may also be printed or provided on the voucher for later use in establishing a use account and during authentication or redemption as described above. In one embodiment, the voucher is a Single Inline Memory Module (SIMM) card.

A voucher that is initialized by the lottery administration processor 24, sold, created and distributed at steps 200, 202 may then be used in the same manner as the preprinted lottery cards described above in connection with FIG. 2 to place lottery plays. This is illustrated by steps 204–212, i.e., the unique identification code of the voucher is used to establish a user account associated with the voucher (step 204), a lottery play is received and placed using the user account (step 206), a lottery play is checked against the winning plays for that drawing (step 208), the user account is credited if the lottery wager is a winner (210) and the winnings are redeemed using the voucher (212).

Still further, additional vouchers may be initialized, sold, created and distributed and then used to add funds to an established account or to open other accounts, as described above in connection with the preprinted account cards. It is anticipated that a user may prefer to establish a single account with a first lottery card and simply replenish funds in that account by purchasing additional vouchers. Alternatively, the Lottery Agent 40 can directly credit money to an established account, rather than creating a second voucher or subsequent vouchers, through lottery agent processor 44. In this embodiment, the lottery agent processor 44 communicates the unique identification code for the first lottery voucher of the user, as retrieved either visually or from a bar code or other indicia from the first lottery voucher, to the lottery administration processor 24 along with the monetary amount that the user wishes to add to his or her previously opened user account associated with the unique identification code of the first lottery voucher.

The system may be configured such that only vouchers having predefined monetary amounts can be purchased, e.g., $10, $25, $50, etc. Alternatively, the system may allow the user to define a desired monetary amount for the purchased voucher, preferably, however, above a minimum monetary threshold, such as $10.

Figure 3:
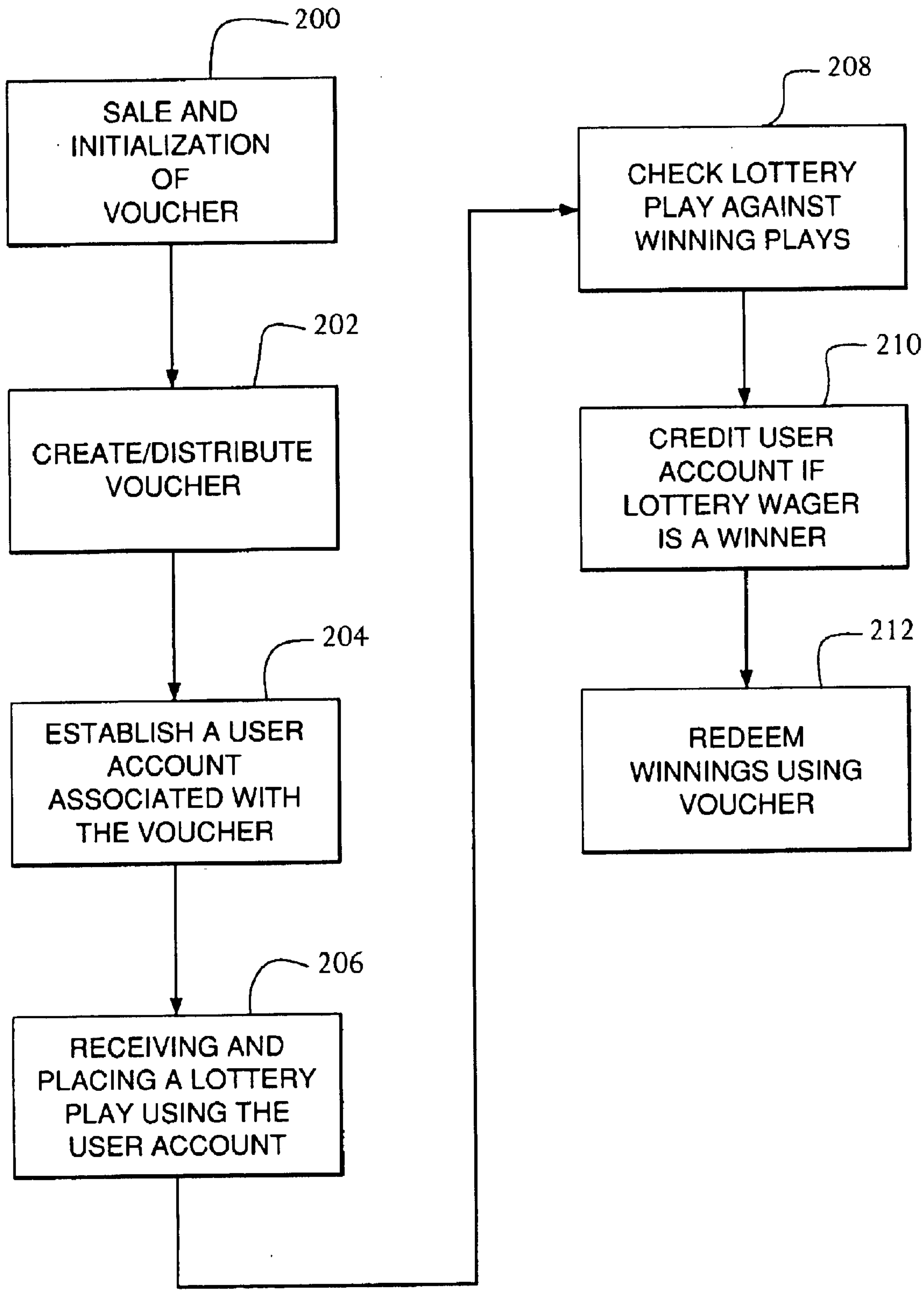
FIG. 3 is a flow diagram illustrating another exemplary method of administering a lottery.

The system and method described in connection with FIG. 1 and FIG. 3 provide the benefit of avoiding the need to preprint cards, register the cards into the lottery system and deliver the cards to a Lottery Agent 40 for sale to a user 60. The system and method may also be employed using existing lottery terminals at Lottery Agents 40 with minor changes to the operating software of the terminals. The system still provides the necessary incentive and motivation to Lottery Agents 40 to promote sales of the vouchers because the Lottery Agent's account maintained by Lottery Administrator 20 can still be credited for commission purposes and bonus purposes. For added security, the user can also establish a pin number associated with the user account as described above.

It is contemplated that the system may utilize both described embodiments to facilitate account based lottery wagering. Lottery cards described above in connection with FIG. 2 may be distributed to some agents and some agents may utilize the voucher-based system described in connection with FIG. 3, or both. In such a system of course, necessary steps should be taken to ensure that unique identification codes of the generated vouchers and the preprinted cards do not overlap.

Although various embodiments have been illustrated, this is for the purpose of describing, and not limiting the invention. Various modifications will become apparent to one skilled in the art and are within the scope of this invention described in the attached claims.

What is claimed is:

1. A method of administering a lottery for a jurisdiction, said lottery being conducted by a centralized lottery administration with lottery tickets being distributed by distributed lottery agents remote from said centralized lottery administration, comprising the steps of:

(a) receiving from a wagerer a communication identifying a unique identification code associated with a first lottery card and associated with a monetary amount, said first lottery card being issued by a lottery agent from said lottery agents;

(b) after step (a), funding at a lottery administration system of said centralized lottery administration a user account associated with the unique identification code for said first lottery card with the monetary amount;

(c) receiving from the wagerer without the assistance of a lottery agent or lottery agent terminal a communication identifying a first chosen play for a lottery game, said first chosen play being associated with said user account;

(d) deducting a cost of the first chosen play from the balance of said user account, a remaining balance in said user account after said deduction being available for making at least one subsequent play; and (e) if it is verified that said first chosen play is a winner, crediting a winning monetary amount for said first chosen play to said user account, wherein said winning monetary amount may be redeemed from said user account upon presentation of said first lottery card to an authorized lottery agent.

2. The method of claim 1, wherein said first lottery card is a first lottery voucher having said unique identification code associated therewith, said method further comprising the steps of:

receiving a communication from said lottery agent indicating the monetary amount for said lottery voucher;

associating said unique identification code with said monetary amount; and authorizing creation and distribution of said first lottery voucher to said wagerer.

3. The method of claim 2, wherein at least one of steps (a) and (c) includes the step of receiving said communication through an interactive voice response (IVR) system.

4. The method of claim 2, wherein at least one of steps (a) and (c) includes the step of receiving said communication through the Internet.

5. The method of claim 2, wherein said remaining balance of step (d) is not redeemable along with said winning monetary amount of stop (e).

6. The method of claim 2, further comprising the steps of:

(f) receiving a communication identifying a subsequent chosen play for a lottery game at a time after said winning monetary amount is credited to said user account, said subsequent chosen play being associated with said user account; and (g) deducting a cost of the subsequent chosen play from the balance of said user account, at least a part of the deducted cost coming from said winning monetary amount for said first chosen play.

7. The method of claim 2, further comprising the steps of:

(f) receiving from said wagerer a communication identifying a unique identification code for at least a second lottery voucher; and (g) crediting a monetary amount associated with said second lottery voucher to said user account associated with the unique identification code for the first lottery voucher, wherein the wagerer can play a lottery game using said user account and redeem any winning amount credited to said user account using said first lottery voucher.

8. The method of claim 2, further comprising the steps of:

(f) receiving from said wagerer a plurality of separate communications collectively identifying unique identification codes for a plurality of lottery vouchers; and (g) crediting a monetary amount associated with each respective lottery voucher from said plurality of lottery vouchers to said user account associated with the unique identification code for the first lottery voucher, wherein the wagerer can play a lottery game using said user account and redeem any winning amount credited to said user account using said first lottery voucher.

9. The method of claim 2, further comprising the steps of:

(f) receiving from said wagerer a communication identifying a unique identification code for a second lottery voucher; and (g) funding a second user account associated with the unique identification code for said second lottery voucher with a monetary amount associated with the second lottery voucher, wherein the wagerer can play a lottery game using said second user account and redeem any winning amount credited to said second user account using said second lottery voucher.

10. The method of claim 2, wherein said unique identification code is an alphabetic, numerical, or alphanumeric code printed on said lottery voucher and said lottery voucher includes a bar code or magnetic strip representing said unique identification code.

11. The method of claim 2, further comprising the step of receiving a balance inquiry for said user account from said wagerer.

12. The method of claim 2, wherein said communication identifying said first chosen play includes an identification of a plurality of lottery numbers selected by said wagerer.

13. The method of claim 2, wherein said communication identifying said first chosen play includes a request for a random selection of lottery numbers, said method further comprising the steps of:

(f) randomly generating a plurality of lottery numbers;

(g) associating said generated plurality of lottery numbers with said unique identification code for said first lottery voucher; and (h) providing said generated plurality of lottery numbers to said wagerer.

14. The method of claim 2, further comprising the steps of receiving from said lottery agent a communication indicating a monetary amount to be credited to said user account and crediting said monetary amount to said user account.

15. A lottery administration system for administering a lottery, said lottery being conducted by a centralized lottery administration with lottery tickets being distributed by distributed lottery agents remote from said centralized administration, comprising:

(a) means for receiving from a wagerer a communication identifying a unique identification code associated with a first lottery card and associated with a monetary amount, said first lottery card being issued by a lottery agent from said lottery agents;

(b) means for funding at a lottery administration system of said centralized lottery administration after receiving said communication identifying said identification code a user account associated with the unique identification code for said first lottery card with the monetary amount;

(c) means for receiving from the wagerer without the assistance of a lottery agent or lottery agent terminal a communication identifying a first chosen play for a lottery game, said first chosen play being associated with said user account;

(d) means for deducting a cost of the first chosen play from the balance of said user account, a remaining balance in said user account after said deduction being available for making at least one subsequent play, and (e) means for crediting a winning monetary amount for said first chosen play to said user account if it is verified that said first chosen play is a winner, wherein said winning monetary amount may be redeemed from said account upon presentation of said first lottery card to an authorized lottery agent.

16. The system of claim 15, wherein said first lottery card is a first lottery voucher having said unique identification code associated therewith, said system further comprising:

means for receiving a communication from a lottery agent processor indicating the monetary amount for said lottery voucher, means for associating said unique identification code with said monetary amount; and means for authorizing creation of and distribution of said first lottery voucher to said wagerer.

17. The system of claim 16, further comprising:

(f) means for receiving a communication identifying a subsequent chosen play for a lottery game at a time after said winning monetary amount is credited to said user account, said subsequent chosen play being associated with said user account; and (g) means for deducting a cost of the subsequent chosen play from the balance of said user account, at least a part of the deducted cost coming from said winning monetary amount for said first chosen play.

18. The system of claim 16, further comprising:

(f) means for receiving from said wagerer a communication identifying a unique identification code for at least a second lottery voucher; and (g) means for crediting a monetary amount associated with said second lottery voucher to said user account associated with the unique identification code for the first lottery voucher, wherein the wagerer can play a lottery game using said user account and redeem any winning amount credited to said user account using said first lottery voucher.

19. The system of claim 16, further comprising:

(f) means for receiving from said wagerer a communication identifying a unique identification code for a second lottery voucher; and (g) means for funding a second user account associated with the unique identification code for said second lottery voucher with a monetary amount associated with said second lottery voucher, wherein the wagerer can play a lottery game using said second user account and redeem any winning amount credited to said second user account using said second lottery voucher.

20. The system of claim 16, farther comprising:

means for providing a balance for said user account to said wagerer in response to a balance inquiry.

21. The system of claim 16, further comprising means for crediting a monetary amount to said user account in response to a communication from said lottery agent processor.

22. A method of administering a lottery for a jurisdiction, said lottery being conducted by a centralized lottery administration with lottery tickets being distributed by distributed lottery agents remote from said centralized lottery administration, comprising the steps of:

(a) receiving with a lottery administration processor of a lottery administration system of said centralized lottery administration a communication from a lottery agent from said lottery agents indicating a monetary amount to be associated with a first lottery voucher;

(b) assigning a unique identification code to said first lottery voucher and associating said monetary amount with said unique identification code;

(c) after step (b), authorizing creation of and distribution of said first lottery voucher to a wagerer by said lottery agent;

(d) receiving from said wagerer without the assistance of a lottery agent or lottery agent terminal a communication identifying the unique identification code for said first lottery voucher, (e) after step (d), funding at said lottery administration system a user account associated with the unique identification code for said first lottery voucher with the monetary amount associated with said unique identification code for said first lottery voucher;

(f) receiving from the wagerer without the assistance of a lottery agent or lottery agent terminal a communication identifying a first chosen play for a lottery game, said first chosen play being associated with said user account;

(g) deducting a cost of the first chosen play from the balance of said user account, a remaining balance in said user account after said deduction being available for making at least one subsequent play; and (h) if it is verified that said first chosen play is a winner, crediting a winning monetary amount for said first chosen play to said user account, wherein said winning monetary amount may be redeemed from said user account upon presentation of said first lottery voucher to an authorized lottery agent.

23. The method of claim 22, wherein at least one of steps (d) and (f) includes the stop of receiving said communication through an interactive voice response (IVR) system.

24. The method of claim 22, wherein at least one of steps (d) and (f) includes the step of receiving said communication through the Internet.

25. The method of claim 22, further comprising the stops of:

(i) receiving a communication identifying a subsequent chosen play for a lottery game at a time after said winning monetary amount is credited to said user account, said subsequent chosen play being associated with said user account; and (j) deducting a cost of the subsequent chosen play from the balance of said user account, at least apart of the deducted cost coming from said winning monetary amount for said first chosen play.

26. The method of claim 22, further comprising the steps of:

(i) receiving a communication from a lottery agent indicating a monetary amount to be associated with a second lottery voucher;

(j) assigning a second unique identification code to said second lottery voucher and associating said monetary amount to be associated with said second lottery voucher with said second unique identification code;

(k) authorizing creation of and distribution of said second lottery voucher to said wagerer by said lottery agent;

(l) receiving from said wagerer a communication identifying the second unique identification code; and (m) crediting the monetary amount associated with said second lottery voucher to said user account associated with the unique identification code for the first lottery voucher, wherein the wagerer can play a lottery game using said user account and redeem any winning amount credited to said user account using said first lottery voucher.

27. The method of claim 22, further comprising the steps of:

(i) receiving a communication from a lottery agent indicating a monetary amount to be associated with a second lottery voucher;

(j) assigning a second unique identification code to said second lottery voucher and associating said monetary amount to be associated with said second lottery voucher with said second unique identification code;

(k) authorizing creation of and distribution of said second lottery voucher to said wagerer by said lottery agent;

(l) receiving from said wagerer a communication identifying the second unique identification code; and (m) funding a second user account associated with the second unique identification code with the monetary amount associated with the second lottery voucher, wherein the wagerer can play a lottery game using said second user account and redeem any winning amount credited to said second user account using said second lottery voucher.

28. The method of claim 22, further comprising the steps of receiving from a lottery agent a communication indicating a monetary amount to be credited to said user account and crediting said monetary amount to said user account.

29. The method of claim 22, wherein said first lottery voucher include said unique identification code printed thereon and secondary indicia representing said unique identification code.

30. The method of claim 29, wherein said secondary indicia includes a bar code or a magnetic strip.

31. The method of claim 22, wherein said first lottery voucher is a SIMM card.

* * * * *